United States Patent [19]

Furman

[11] 4,025,262

[45] May 24, 1977

[54] VARIABLE LENGTH EXTRUSION DIE

[75] Inventor: Anthony H. Furman, Schenectady, N.Y.

[73] Assignee: General Electric Company, Schenectady, N.Y.

[22] Filed: Nov. 18, 1974

[21] Appl. No.: 524,576

[52] U.S. Cl. ................................ 425/145; 425/155; 425/164; 425/381; 425/466

[51] Int. Cl.² ........................................... B29F 3/06

[58] Field of Search .......... 425/466, 381, 246, 145, 425/146, 147, 149, 135, 162, 166, 163, 164, 155; 264/40, 148

[56] References Cited

UNITED STATES PATENTS

| | | | |
|---|---|---|---|
| 1,775,735 | 9/1930 | Reker | 425/381 X |
| 2,885,734 | 5/1959 | Wucher | 425/246 X |
| 3,131,430 | 5/1964 | Rodenacker | 425/146 |
| 3,144,682 | 8/1964 | Thielfoldt | 425/381 |
| 3,381,072 | 4/1968 | Mutton et al. | 264/148 |
| 3,642,405 | 2/1972 | Eggenberger et al. | 425/149 |
| 3,698,846 | 10/1972 | Leutner | 425/149 |

*Primary Examiner*—Francis S. Husar
*Assistant Examiner*—Mark Rosenbaum
*Attorney, Agent, or Firm*—Leo I. MaLossi; Joseph T. Cohen; Jerome C. Squillaro

[57] ABSTRACT

Improved extrusion apparatus is shown for the preparation of a rod-like body from a coal-containing particulate mixture. Control means are disclosed for manually or automatically infinitely adjusting the length, within a preselected range, of the consolidating coal-containing mixture in contact with the surface of the die in response to selected parameters. In the preferred embodiment the operative length of the die may be varied by the control means.

9 Claims, 4 Drawing Figures

VARIABLE LENGTH EXTRUSION DIE

BACKGROUND OF THE INVENTION

Apparatus for the extrusion of a cohesive, continuous rod-like coal-containing body directly into coal gasification apparatus, which body is subdivided into briquettes for distribution in the gasification apparatus, is disclosed in U.S. patent application Ser. No. 316,455 — Furman (now abandoned) filed Dec. 19, 1972 and assigned to the assignee of the instant invention.

DESCRIPTION OF THE INVENTION

Improved extrusion apparatus is shown for the preparation of a rod-like body from a coal-containing particulate mixture. Control means are disclosed for manually or automatically adjusting the length, within a preselected range, of the consolidating coal-containing mixture in contact with the surface of the die in response to selected parameters.

In the preferred embodiment the operative length of a movable die may be varied by the control means. In this embodiment, adjustment of die length is described both as a function of the hydraulic pressure conditions required to maintain the movable die position and, alternatively, as a function of the work required to drive the extruder screw. In addition, means are provided for direct visual examination of the coal-containing body leaving the die whereby, depending upon the appearance of the extruded body, the satisfactory conduct of the extrusion process may be ascertained.

Also, although not described in detail in the specification, adjustment of the length of the consolidating coal-containing mixture in contact with the surface of the die in response to selected parameters may be effectuated by controlled axial movement of the extrusion screw.

Another device for controllably varying the density of an extruded rod-like coal-containing body during its formation in the die is disclosed in U.S. patent application Ser. No. 524,577 — Furman filed Nov. 18, 1974, and assigned to the assignee of the instant invention. This other device is disposed adjacent the discharge end of the extrusion die and may be utilized by itself or, as is disclosed therein, in combination with an embodiment of the instant invention.

Although hydraulic mechanisms are disclosed herein for effectuating movable die length adjustment (within a preselected die length), the use of equivalent (e.g. electromechanical) means are contemplated and are included within the scope of this invention. Specific commercially available sensing and control devices disclosed herein are solely illustrative.

The use of the apparatus of this invention for the preparation of rod-like briquettes of various compositions and characteristics using either swelling or non-swelling particulate coal together with suitable binder material and with or without the addition of other materials, e.g. agents for overcoming swelling, is contemplated. Preferably, briquettes prepared by the use of the apparatus of this invention retain their shape and are able to support themselves at least through a temperature exposure of about 950° F. Typically, during exposure to such a temperature, devolatization will occur leaving a charred briquette.

Although the instant invention is illustrated for the production of a solid rod extrudate, a hollow rod extrudate can also be advantageously produced as by modifying the extruder screw to provide a centrally-located rod extension (not shown herein) to form the hole.

Materials for construction of the extrusion apparatus sight port, drive means, heating means, control means, discharge means, etc. are conventional.

BRIEF DESCRIPTION OF THE DRAWING

The exact nature of this invention as well as objects and advantages thereof will be readily apparent from consideration of the following specification relating to the annexed drawing in which.

MANNER AND PROCESS OF MAKING AND USING THE INVENTION

Figure 1:
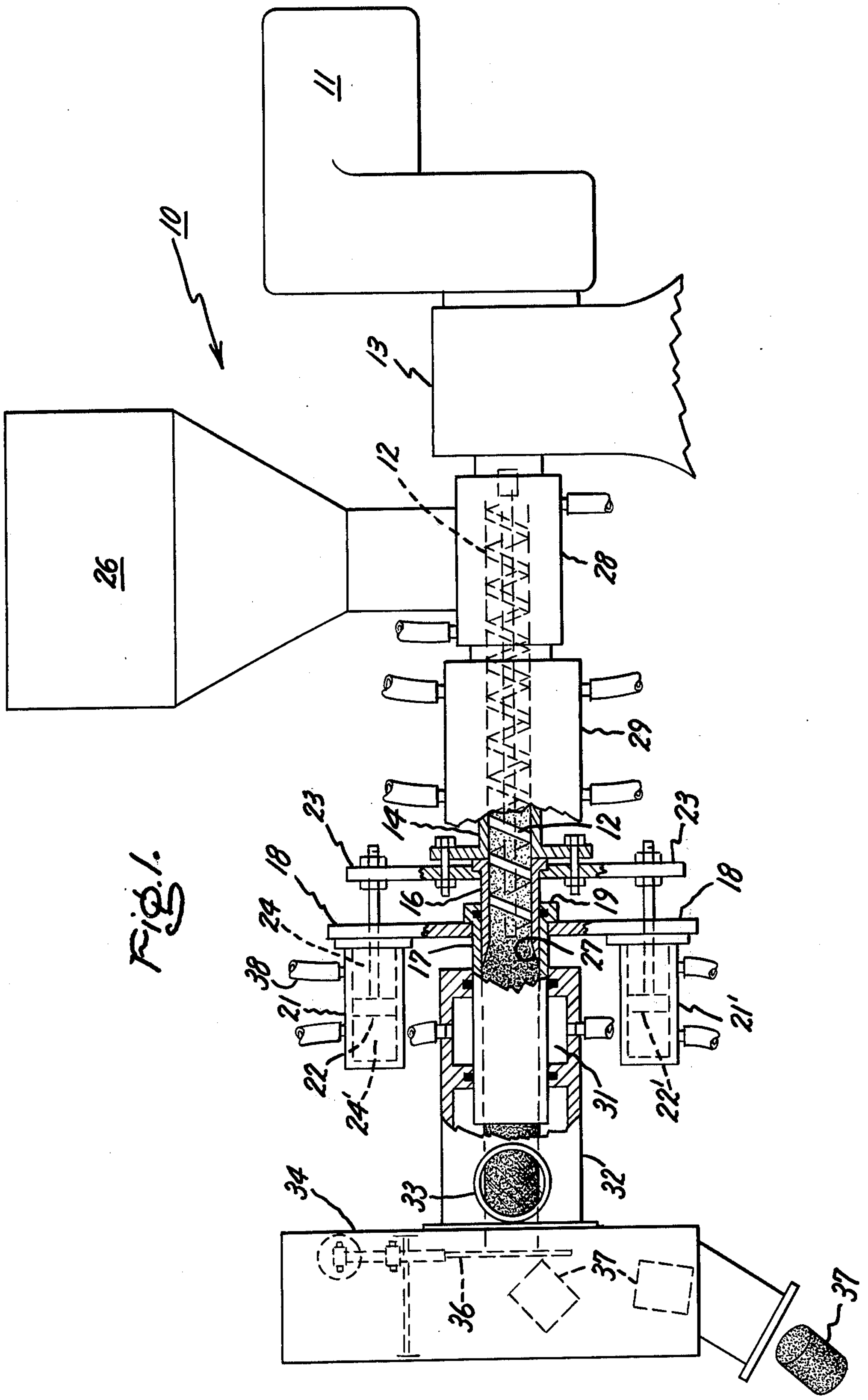
FIG. 1 is a schematic representation, partially cut away, embodying die construction illustrative of the improvement of the instant invention in coal-extrusion apparatus.

The improved extrusion apparatus 10 of the instant invention is illustrated in FIG. 1 as employing in combination drive motor 11 coupled to extruder screw 12 via variable speed control 13, screw 12 being disposed within extruder barrel 14 shown with an extension 16 therefor. Elements 14 and 16 may, of course, be constructed as a unified construction, rather than as joined pieces. However, the construction shown facilitates easy replacement of the outer end of the extrusion barrel, this being the portion thereof subject to greatest wear.

Die means 17 of substantially constant cylindrical internal cross-section is disposed with a portion of the inner surface thereof in telescoping relationship with the outer wall surface of barrel portion 16, being positioned therealong by force applied by plate 18 against shoulder 19 of die 17 under the influence of die actuator hydraulic cylinders 21, 21'. Although the use of a pair of such die actuators has been found to be adequate, a larger number may be employed. The pistons 22, 22' of the die actuators are stationary, being affixed to plate 23 which also serves to fixedly locate barrel portion 16 as shown.

Considering cylinder 21 by way of example, as hydraulic fluid is introduced under pressure into region 24 behind piston 22 (hydraulic fluid being simultaneously withdrawn from region 24' in front of piston 22) cylinder 21, and thereby plate 18 and die 17, are moved toward plate 23. This action reduces the amount of internal die area available for contact with the coal-containing mixture as it becomes consolidated within the die under the action of extruder screw 12.

Such a condition produces reduced frictional resistance between the consolidating body and the die, thereby resulting in a less dense rod-like body. The reverse action (removal of hydraulic fluid from region 24 and introduction of such fluid to region 24') permits die 17 to slidably move away from plate 23 under the action of the frictional force acting between the consolidating coal-containing mixture and the inner surface of die 17.

Thus, a particulate mixture comprising coal and a binder therefor is introduced into barrel 14 from feed means 26 in flow communication therewith, is moved to the left under the action of the flights of extruder screw 12 and is forced out of barrel portion 16 provided with knife edge 27 and into die 17. Therein, by the combined action of force applied by extruder screw 12 and the friction developed between the moving, coal-containing mass and the inner surface of die 17, consolidation into a rod-like body results. At various stations along the length of the extruder barrel and die 17 means are shown for selectively and controllably heating or cooling the coal-containing mixture as it is moved along the extrusion path for consolidation in die 17. These heating means, designated by numerals 28, 29 and 31, are provided with inlet and outlet ports via which the heat transfer fluid is circulated.

As the rod-like coal-containing body emerges from die 17 within housing 32, the condition thereof may be viewed through sealed sight port 33 equipped with a transparent wall portion made of glass or plastic. If the emerging rod-like body is not sufficiently dense (as may be ascertained by visual examination of the surface thereof), adjustments may be made in the system as will be described hereinbelow to properly correct for this condition.

The continuous rod-like body passes into chopper mechanism 34 in which a guillotine blade 36 automatically subdivides the rod into briquettes 37. In the event that extruder apparatus 10 is being used for charging a coal gasifier, briquettes 37 pass directly into the interior of the gasifier (not shown) in which case the interior of device 34 is exposed to the pressure/temperature conditions of the gasifier and must be constructed accordingly.

Figure 2:
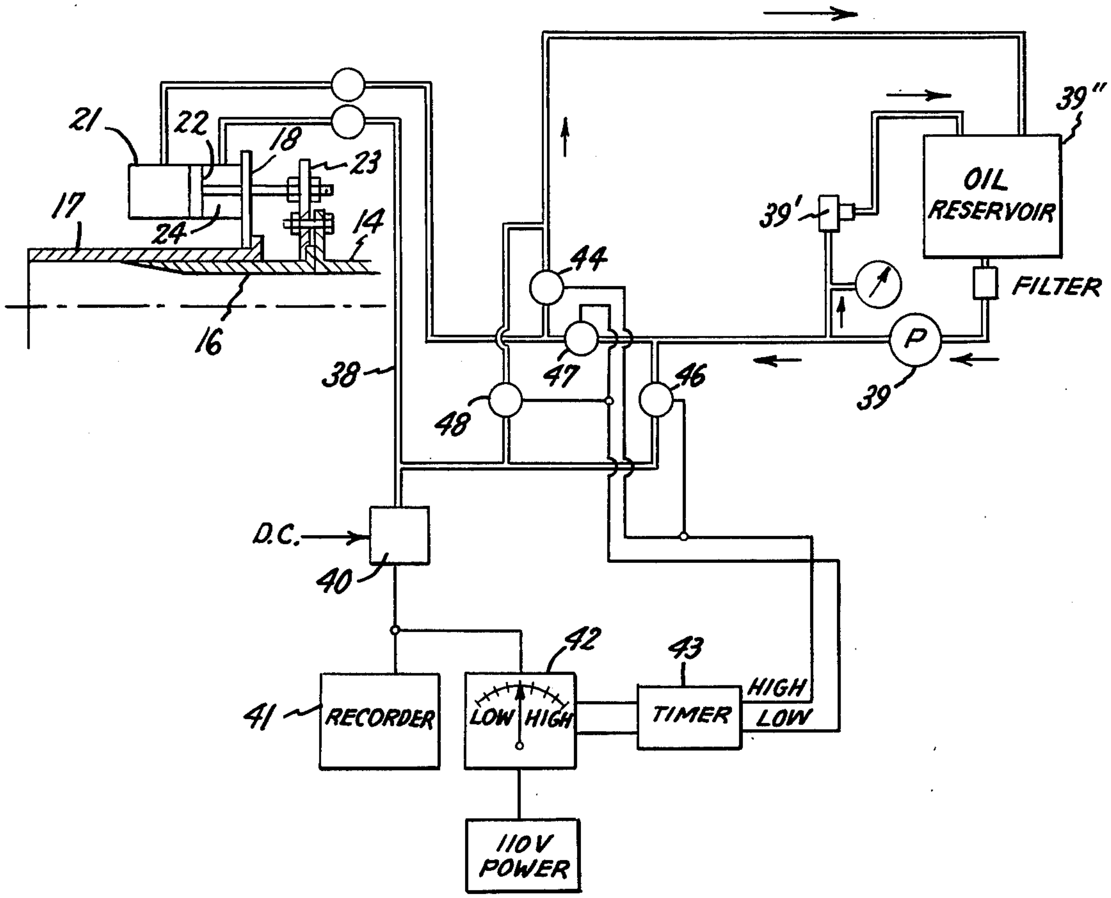
FIG. 2 is a schematic representation of sensing and die-position control means according to the instant invention in which hydraulic pressure feedback is used to generate an automatic control signal.
Figure 3:
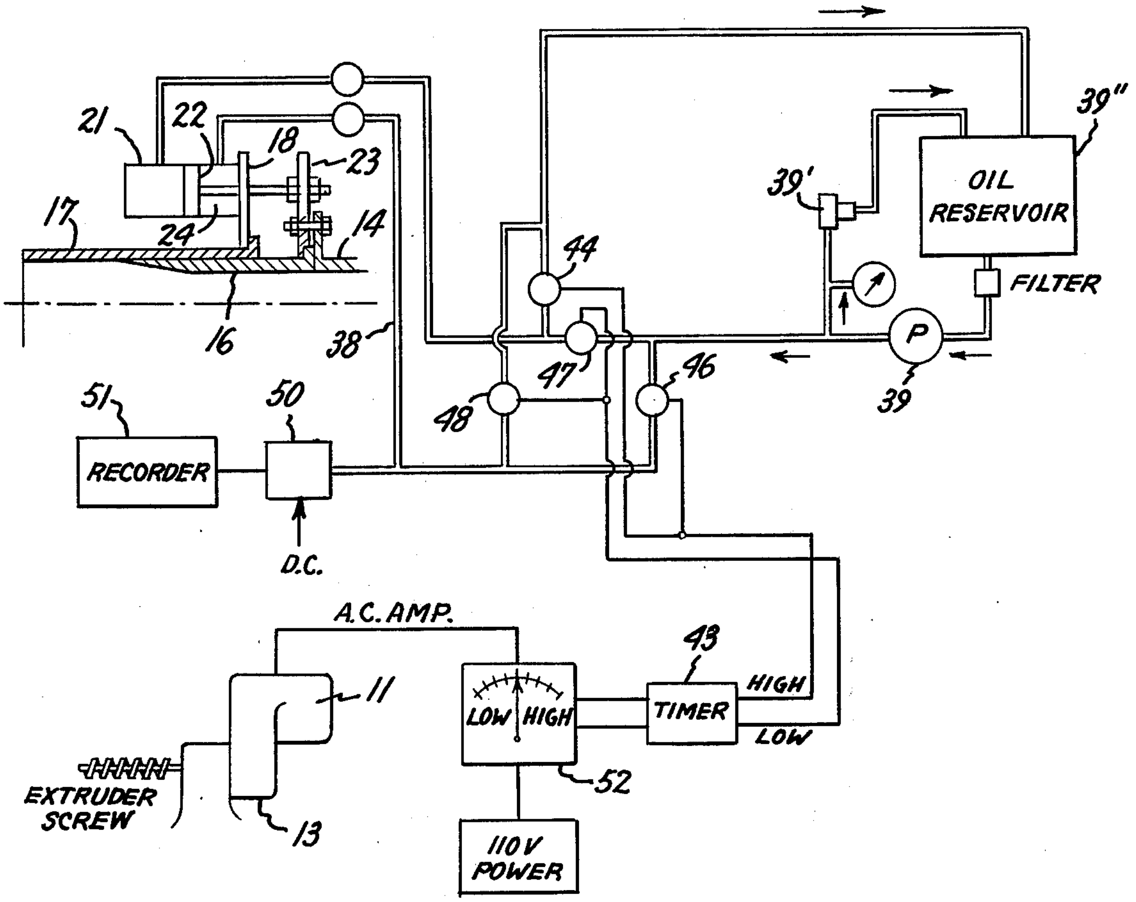
FIG. 3 is a schematic representation of sensing and control means for positioning the die in accordance with the instant invention in response to a parameter reflecting the work performed in the extrusion process. Electrical connection shown in FIGS. 2 and 3 as single lines are actually multi-wire cables providing complete electrical circuits between the elements connected

Means responsive to selected parameters are shown in FIGS. 2 and 3 for control of the positioning of die 17. The make-up and interrelationship of these sensing and control devices is best described in connection with the various operating conditions encountered in extruder apparatus 10.

At start-up, die 17 is empty and has been moved in its telescoping relationship with barrel portion 16 as far from plate 23 as is permitted by the construction. Initially, as the powdered coal-containing mix is introduced into barrel 12 from feed hopper 26, the mixture is moved through the extruder barrel and out of the die relatively unchanged. However, in a short period as operation continues, the powdered mixture begins to consolidate into a cohesive body. The development of this body and the increase in cohesiveness and density can be viewed (e.g. surface smoothness and shininess) through sight port 33. At the same time the changing density characteristics are indicated by the change in the trace on a monitoring (to be described hereinbelow) and/or by a change in the meter reading reflecting current demand of the screw driver motor 11. Thus, the operator can rely on visual observation through port 33 together with observation of either or both of the recorder and meter.

As a solidified rod-like body begins to be discharged from die 17, automatic control of the placement of die 17 begins to be effective. The pressure of hydraulic fluid behind the pistons in die actuator cylinders 21, 21' is sensed via line 38 and is converted to an electrical signal by transducer 40 (Dynisco 0–1000 psi Pressure Transducer No. PTI19H-5C). Requisite D.C. input to transducer 40 is provided as shown from a power supply (Lambda Regulated Power Supply [D.C.] Model LE01) not shown. The voltage signal output from transducer 40 is simultaneously fed to recorder 41 (Leeds and Northrup 0–50 mv. Strip Recorder Speedomax H, No. 3-932-000-045-6-15-80) for the generation of a visual display and to a meter relay 42 (Calex Voltsensor, Model 512A having adjustable high and low set points for the closing of separate switch contacts (not shown).

Hydraulic fluid under pressure is provided in the hydraulic circuit (or hydraulic fluid supply means) shown. Pump 39 may operate continuously or be automatically actuated. When pump 39 operates, fluid under pressure either is admitted to the hydraulic die actuators (solenoid valves open) or is circulated via pressure release valve (PRV) 39' to and from the oil reservoir 39''. The PRV maintains a constant pressure (e.g. about 1000 psi or greater) for the hydraulic fluid.

A meter-type relay is preferred, because it facilitates setting of the high and low switch points and provides a second (in addition to the recorder) visual indication of the extent to which rod compaction is occurring.

The recorder trace will reflect changes in pressure in the hydraulic actuators behind (e.g. in volume 24) in pistons. The trace on the recorder (in millivolts) is to be kept in some preselected range reflecting the operable pressure. This range will be a constant for a given coal, but usually varies from coal to coal. Operation in a preselected high range of millivolt output for a first coal would be equivalent in power requirement for overcoming the die wall friction encountered therewith as the power requirement would be with a second coal having a preselected lower range of millivolt output. In the first instance, (the first coal) the die is further extended to provide greater area for contact with the developing rod.

Variations and characteristics of the particulate coal-containing mixture would, if not controlled, cause changes in the frictional resistance within the die 17, which in turn would change the density of the developing rod. To prevent such an occurrence, the feedback systems such as are shown in FIGS. 2 and 3 and described herein are provided.

As operation is continued, if the condition should develop in which excessive friction occurs between the developing rod and the inner wall of die 17, the electrical signal from transducer 40 will have increased to a value causing the high set point of meter relay 42 to trip and close a switch (not shown), which sends an electrical signal to timer 43 (Cam Timer No. 1600A090).

Timer 43 provides for an interrupted passage therethrough of the electrical signal received thereby (i.e. the electrical signal can enter the circuit shared by the high set point with solenoid-operated valves 44 and 46 (ASO Solenoids No. 967399) whereby these valves are opened for a preselected time). The preselected time provides a delay period during which the system can respond to the changed conditions and provide feedback information reflecting these changed conditions. This precaution avoids "hunting" in the system. Solenoid valves 44 and 46 operate "on" and "off" in response to the operation of timer 43 to move die 17 in steps to the right (plate 18 moves closer to plate 23) progressively decreasing the frictional resistance between the inner surface of the die and the consolidating coal-containing mixture. This step-wise readjustment continues until the voltage signal from transducer 40 to meter relay 42 decreases enough so that the meter relay high set point switch opens and further intermittent operation of solenoid valves 44 and 46 ceases and the valves remain closed.

Under the operating conditions in which the pressure sensed by transducer 40 (and viewed on recorder 41 and meter relay 42) is too low thereby indicating insufficient density in the developing coal-containing rod, the voltage signal from transducer 40 to meter relay 42 will be so low that the low set point is tripped closing a switch and sending an electrical signal to timer 10 for intermittent passage (as described above) therethrough into the low pressure circuit. Via this circuit, an electrical signal reaches solenoid valves 47, 48 (ASCO Solenoids) whereby these valves are opened to permit the passage of hydraulic fluid therethrough.

Solenoid valves 47, 48 operate on and off in response to signals from timer 10 via the low pressure circuit. When these solenoid valves are in the open position hydraulic fluid at the operating pressure enters the hydraulic cylinders in front of the stationary pistons thereby permitting the consolidating material passing through die 17 in frictional relationship with the inner surface of the wall thereof to gradually move die 17 into a more extended position. In the more extended position, greater friction develops between the material passing through the die and the die wall, this greater friction in turn increases the density of the forming rod and reflects an increased pressure requirement behind the fixed pistons in order to hold die 17 in position. This increased pressure is sensed by transducer 40 and, when the voltage signal generated thereby going to meter relay 42 becomes large enough, the low set point meter relay switch opens ceasing further intermittent operation of solenoid valves 47, 48, which thereupon remain closed.

An alternate method of providing automatic control for the disposition of die 17 is shown in FIG. 3. As in FIG. 2, in order to simplify the drawing, only fragmented portions of the die and extruder and one of the hydraulic die actuators are set forth. The hydraulic system including the solenoid valves is the same as is described in FIG. 2. In essence this alternate method provides automatic control in response to the force required to rotate the extruder screw.

Although the hydraulic pressure behind the fixed pistons of the hydraulic die actuators is, preferably, also sensed (transducer 50) to provide a record (recorder 51) of the extrusion operation, the pressure so sensed is not employed for automatic positioning of die 17. In this embodiment, die positioning is automatically accomplished by sensing the motor current draw of motor 11 (shown coupled to the extruder screw via variable speed control 13).

Figure 4:
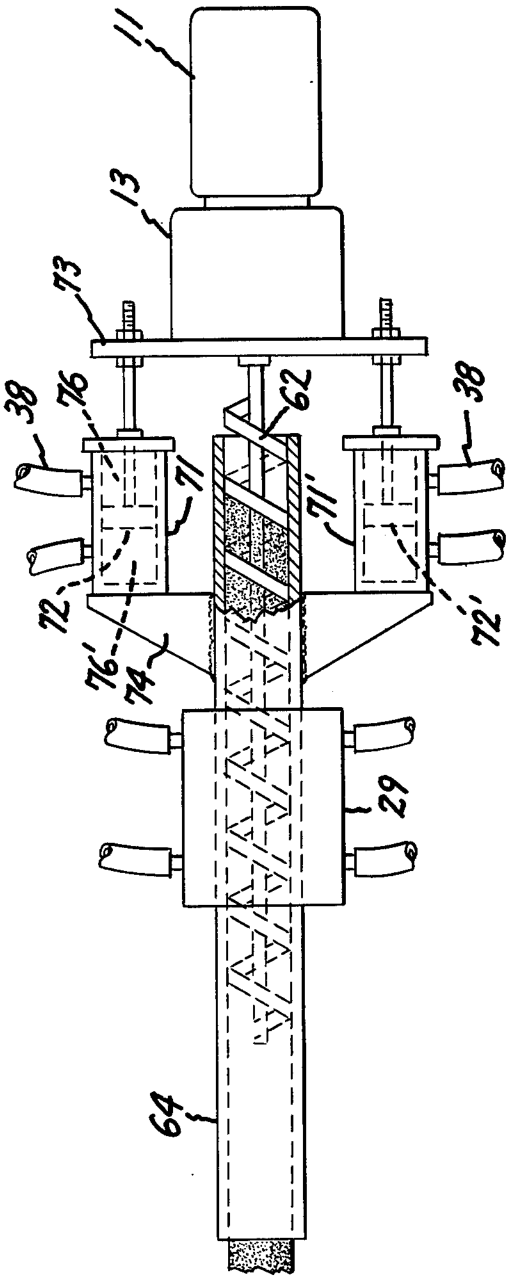
FIG. 4 is a schematic representation in plan and partly in section of structure for axially positioning the extruder screw whereby the requisite relative movement between the die and the extruder screw may be effectuated in order to vary the extent of internal surface area of the die in contact with the developing rod.

The motor current draw is sensed by meter relay 52 (Simpson 0-5A, A.C. Meter Relay Dual [high low set point]). When excessive friction is generated between the developing rod-like body and the inner surface of the wall of the die, the motor current draw increases, because motor 11 must work harder to force the rod-like body through die 17. When the opposite condition occurs, that is, when too little friction is encountered between the developing rod-like body and the inner surface of the wall of the die, motor 11 has less of a demand placed upon it to rotate the extruder screw and, consequently, the motor current draw is low. Tripping of the set points (high and low), closing of relay switches thereby, operation of timer 43 and operation of the hydraulic system in response to too-high or too-low motor current draw is the same as operation described hereinabove with respect to too-high or too-low pressure feedback. The provisions for automatic control of the disposition of die 17 are equally applicable to an alternate arrangement wherein the die is stationary, but the extruder screw is axially positionable as is shown in FIG. 4. The hydraulic system (not shown) is the same as is described for FIGS. 2 and 3.

In contrast to the stationary nature of pistons 22,22', pistons 72,72' are affixed to movable plate 73 as are extruder screw 62, variable speed control 13 and motor 11. The housings of hydraulic actuators 71,71' are stationary being affixed to barrel/die 64 by means of brackets 74. The term "barrel/die" simply indicates that the die means is an extensionof the extruder barrel. The unified structure may be made of joined pieces, if desired. As noted in connection with FIG. 1, although the use of a pair of hydraulic actuators is shown, a larger number may be employed.

As hydraulic fluid is introduced under pressure into region 76 behind piston 72 (hydraulic fluid being simultaneously withdrawn from region 76' in front of piston 72), piston 72 and thereby plate 73, extruder screw 62, variable speed control 13 and motor 11 are moved forward (to the left) causing extruder screw 62 to penetrate further into barrell die 64. This action reduces the amount of internal die area available for contact with the coal-containing mixture and reduces the frictional resistance therebetween. The reverse action results in reducing the penetration of extruder screw into barrel/die 64 and, thereby, increases the frictional resistance to the extrusion process. Housing 32 is not shown, nor is the balance of the downstream structure, but this is merely to simplify the drawing.

Operation of the sensing and control devices of FIGS. 2 and 3 is unchanged to effectuate the desired increases and decreases of frictional resistance in the die means of barrel/die 64. One of the advantages of this embodiment is the fact that there is no need for a change in cross-section from the barrel to the die.

Thus, once operation of the extrusion apparatus has reached the point at which the particulate coal-containing mixture observed through sight port 33 exiting from die 17 begins to develop into a cohesive body, disposition of the die) or positioning of the extruder screw, if axial movement thereof is employed as the mechanism for varying the extent of internal surface area of the die in contact with the developing rod) is automatically accomplished. In addition, in the embodiments of FIGS. 2 and 3, one or more manually-operated switches (not shown) may be introduced in order to energize either the high or low circuits in order to manually control the placement of die 17. Also, each of the solenoids 44, 46, 47, 48 is manually operable.

Simultaneously sensing of pressure and motor current draw as is shown in the embodiment of FIG. 3 is particularly advantageous in that a comparison of readouts therefrom will indicate whether blockage has occurred in the extrusion barrel, because while the pressure feedback displays the effect of work done in the die, the motor current draw reflects the effects of friction losses in the whole extrusion system.

The availability of a sealed sight port is of particular importance in that with practice, the operator by observing the general texture of the extrudate receives an indication of the density of soundness thereof. Thus, if the surface of the extrudate is smooth and shiny, this is an indication of structural integrity and good sealing between the developing rod-like body and the inner surface of the die wall. Maintenance of a good seal over the peripheral surface of the extrudate is of particular importance when a difference in pressure is maintained between the region to which the extrudate is discharged, e.g. a coal gasifier, and the feeding means to the extruder is to be maintained.

The best mode of this invention has been disclosed herein including the arrangement shown for heating the die, barrel and feed area. The extent of axial adjustment available in the die should be about 1 ½ times the diameter of the die. In practicing the method of this invention it is preferred that the particles of material entering the apparatus be free-flowing, or relatively so.

I claim:

1. In an apparatus for the extrusion of a cohesive, continuous, rod-like coal-containing body wherein an extruder screw is disposed within extruder barrel construction, which in turn is connected to feed and discharge structures spaced from each other, said feed structure being means for feeding a mixture containing powdered coal and a binder into said barrel construction and said discharge structure being die means for receiving and shaping the mixture forcibly discharged from said barrel construction, means being provided adjacent said barrel construction for heating at least a portion thereof, means positioned downstream of said die means for severing the emerging rod-like body into smaller portions and means operatively associated with said screw for driving said screw, the improvement comprising:

a. said die means being of substantially constant cylindrical configuration internally with the downstream end thereof remaining open throughout the extrusion operation and b. means for controllably infinitely varying within a preselected range the extent of internal surface area of said die means available for contact with the consolidating coal-containing mixture, said die means retaining a substantially cylindrical configuration and said varying means being connected to an element in the group of elements consisting of said die means and said extruder screw whereby relative movement between said die means and said extruder screw is provided.

2. The improvement of claim 1 wherein a portion of the inner surface of the wall of the die means is in telescoping relationship with the outer surface of the wall of the extruder barrel construction and the varying means is connected to said die means.

3. The improved apparatus of claim 2 wherein the varying means include means for the automatic actuation thereof as a function of the force required to hold the die means in a given position relative to the extruder barrel construction.

4. The improved apparatus of claim 3 wherein the varying means comprise hydraulically-actuated positioning means connected to the die means, means in flow communication with said positioning means for sensing hydraulic pressure therein and generating a voltage signal in response thereto, means electrically connected to said sensing and generating means for selectively placing hydraulic fluid supply means in flow communication with said positioning means for actuating said positioning means to reposition said die means.

5. The improved apparatus of claim 4 wherein the means for selectively placing in flow communication includes a relay, a timer and a plurality of electrically-actuable valves, said relay being connected to said sensing and generating means having high and low set point switches, said switches being connected to the input circuitry of said timer, said valves being electrically connected to the output circuitry of said timer and being in flow communication with both the hydraulic fluid supply means and the positioning means.

6. The improved apparatus of claim 2 wherein the varying means include means for the automatic actuation thereof as a function of the force exerted by the means for driving the extruder screw.

7. The improved apparatus of claim 6 wherein an electric motor is employed to drive the extruder screw and the varying means comprise hydraulically-actuated positioning means connected to the die means, means electrically connected to said motor for sensing the current draw thereof and means electrically connected to said sensing means for selectively placing hydraulic fluid supply means in a flow communication with said positioning means to reposition said die means.

8. The improved apparatus of claim 7 wherein the means for selectively placing in flow communication includes a relay, a timer and a plurality of electrically-actuable valves, said relay being connected to the sensing means and having high and low set point switches, said switches being connected to the input circuitry of said timer, said valves being electrically connected to the output circuitry of said timer and being in flow communication with both the hydraulic fluid supply means and the positioning means.

9. The improved apparatus of claim 1 wherein a sight port is provided adjacent the discharge end of the die means whereby the emerging rod-like body may be viewed.

* * * * *